US011694152B2

(12) United States Patent
McAlister et al.

(10) Patent No.: US 11,694,152 B2
(45) Date of Patent: Jul. 4, 2023

(54) SYSTEM AND METHOD FOR PROCESSING SHIPMENT REQUESTS USING A MULTI-SERVICE SHIPPING PLATFORM

(71) Applicant: Simpler Postage, Inc., San Francisco, CA (US)

(72) Inventors: Graham McAlister, San Francisco, CA (US); Sheng Gu, San Francisco, CA (US); Andrew Kramolisch, San Francisco, CA (US); Michael Kimelblat, San Francisco, CA (US); Faye Zhang, San Francisco, CA (US); Minghang Cai, San Francisco, CA (US)

(73) Assignee: Simpler Postage, Inc., Lehi, UT (US)

( * ) Notice: Subject to any disclaimer, the term of this patent is extended or adjusted under 35 U.S.C. 154(b) by 244 days.

(21) Appl. No.: 17/070,812

(22) Filed: Oct. 14, 2020

(65) Prior Publication Data

US 2022/0114543 A1 Apr. 14, 2022

(51) Int. Cl.
*G06Q 10/0834* (2023.01)
*G06Q 10/083* (2023.01)

(52) U.S. Cl.
CPC ..... *G06Q 10/0834* (2013.01); *G06Q 10/0838* (2013.01)

(58) Field of Classification Search
CPC .............. G06Q 10/0834; G06Q 10/0838
See application file for complete search history.

(56) References Cited

U.S. PATENT DOCUMENTS

| 6,963,861 | B1 | 11/2005 | Boucher et al. |
| 8,407,154 | B1 | 3/2013 | Fallows |
| 10,163,119 | B1 | 12/2018 | Bolton et al. |
| 11,144,868 | B1 * | 10/2021 | McBride ............ G06Q 10/0833 |
| 11,151,496 | B2 | 10/2021 | Mahajan et al. |
| 11,551,182 | B2 | 1/2023 | Newell et al. |
| 2002/0095347 | A1 * | 7/2002 | Cummiskey ....... G06Q 30/0601 |
| | | | 705/26.1 |
| 2003/0233289 | A1 | 12/2003 | Yang et al. |
| 2004/0199362 | A1 | 10/2004 | Cao et al. |
| 2006/0136237 | A1 | 6/2006 | Spiegel et al. |
| 2006/0224398 | A1 | 10/2006 | Lakshman et al. |
| 2007/0208585 | A1 | 9/2007 | Bernhard et al. |
| 2009/0037203 | A1 | 2/2009 | Gallagher et al. |
| 2010/0125494 | A1 * | 5/2010 | Boss ..................... G06Q 50/28 |
| | | | 705/401 |
| 2010/0145754 | A1 | 6/2010 | Rahman |
| 2010/0274609 | A1 | 10/2010 | Shoemaker et al. |

(Continued)

FOREIGN PATENT DOCUMENTS

WO 2018237012 A1 12/2018

OTHER PUBLICATIONS

"Integrating Shipment Tracking: shipping APIs and EDIs from Major Carriers and Aggregators", published by altexsoft.com, on Jun. 11, 2020, accessed Jul. 1, 2022. (Year: 2020).*

(Continued)

*Primary Examiner* — Emmett K. Walsh
*Assistant Examiner* — Larita L. Yusuf
(74) *Attorney, Agent, or Firm* — Jeffrey Schox; Diana Lin

(57) ABSTRACT

Systems and methods for processing shipment request by using a multi-carrier shipping services platform.

19 Claims, 10 Drawing Sheets

(56) References Cited

U.S. PATENT DOCUMENTS

| | | | | |
|---|---|---|---|---|
| 2010/0312593 | A1* | 12/2010 | Johnston | G06Q 40/02 |
| | | | | 705/52 |
| 2011/0047000 | A1* | 2/2011 | Perry | G06Q 10/08 |
| | | | | 705/7.29 |
| 2012/0136571 | A1 | 5/2012 | Simon et al. | |
| 2014/0108324 | A1 | 4/2014 | Chen et al. | |
| 2014/0330741 | A1 | 11/2014 | Bialynicka-Birula et al. | |
| 2017/0154347 | A1* | 6/2017 | Bateman | G06Q 50/28 |
| 2018/0165635 | A1 | 6/2018 | Modica et al. | |
| 2019/0156283 | A1 | 5/2019 | Abebe et al. | |
| 2019/0258978 | A1 | 8/2019 | Mahajan et al. | |
| 2019/0332991 | A1 | 10/2019 | Ojiro et al. | |
| 2020/0118071 | A1 | 4/2020 | Venkatesan et al. | |
| 2020/0143319 | A1 | 5/2020 | Fu et al. | |
| 2020/0342398 | A1 | 10/2020 | Aggarwal et al. | |
| 2020/0356408 | A1* | 11/2020 | Gentry | G06F 9/5011 |
| 2021/0090010 | A1 | 3/2021 | Cui et al. | |
| 2021/0150384 | A1 | 5/2021 | Dasgupta et al. | |
| 2021/0304133 | A1 | 9/2021 | Anandam et al. | |
| 2021/0365883 | A1 | 11/2021 | Marbut et al. | |
| 2021/0374632 | A1 | 12/2021 | Côté et al. | |
| 2021/0374665 | A1 | 12/2021 | Young et al. | |

OTHER PUBLICATIONS

Antoine Charles Jean Jonquais, Predicting Shipping Time with Machine Learning, Jun. 2019 (Year: 2019).*

Rusul Abduljabbar *, Hussein Dia *, Sohani Liyanage and Saeed Asadi Bagloee, Applications of Artificial Intelligence in Transport: An Overview, Sustainability, Jan. 2, 2019 (Year: 2019).*

Antoine Charles Jean Jonquais, "Predicting Shipping Time with Machine Learning" Program in Supply Chain Management in Partial Fulfillment of the Requirements for the Degree of Master of Applied Science in Supply Chain Management, May 10, 2019.

Chauhan, Nagesh Singh, "Model Evaluation Metrics in Machine Learning", KDnuggets, (May 28, 2020) (Year: 2020).

Engelbrektsson, Gustaf , "Forecasting Future Delivery Orders to Support Vehicle Routing and Selection", KTH Royal Institute of Technology School of Electrical Engineering and Computer Science, Oct. 4, 2018 (Year: 2018).

Herman-Saffar, OR , "Delivery Date Estimation: Technical challenges you can face when dealing with time-related and dynamically changing environments", Towards Data Science, (Sep. 10, 2019) (Year: 2019).

Hota, H.S., et al., "Time Series Data Prediction Using Sliding Window Based RBF Neural Network", International Journal of Computational Intelligence Research, ISSN 0973-1873, vol. 13, No. 5 (2017), pp. 1145-1156.

Zheng, Alice , "Evaluating Machine Learning Models: A beginner's guide to key concepts and pitfalls", O'Reilly, (Oct. 21, 2015) (Year: 2015).

Integrating Shipment Tracking: shipping APIs and EDIs from Major Carriers and Aggregators, published by altexsoft.com, on Jun. 11, 2020, all pages (Year: 2020).

Antoine, Charles Jean Jonquais , "Predicting shipping time with machine learning", published by MIT in 2019, all pages. (Year 2019).

Brooke, Cochenour, "Predicting transit times for outbound logistic", published by Purdue University in Aug. 2020, all pages. (Year: 2020).

Nikolaos, Servos , "Travel time prediction in a multimodel freight transport relation using machine learning Algorithms", published by Logistics on Dec. 25, 2019, all pages (Year: 2019).

* cited by examiner

Historical Shipment Data 501

| | | | | | | Time in Transit 502 | |
|---|---|---|---|---|---|---|---|
| Shipment ID | Origin Address | Destination Address | Carrier | Service | Pick-Up-Date | Delivery-Date | Days in Transit |
| 1 | Address1 | Address2 | USPS | FirstClassMail | 1-Jan-20 | 3-Jan-20 | 2 |
| 2 | Address1 | Address3 | USPS | FirstClassMail | 5-Jan-20 | 10-Jan-20 | 5 |
| 3 | Address1 | Address4 | USPS | FirstClassMail | 7-Jan-20 | 11-Jan-20 | 4 |
| 4 | Address1 | Address5 | USPS | Priority Mail | 1-Jan-20 | 3-Jan-20 | 2 |
| 5 | Address1 | Address6 | USPS | Priority Mail | 5-Jan-20 | 7-Jan-20 | 2 |
| 6 | Address1 | Address7 | USPS | Priority Mail | 7-Jan-20 | 9-Jan-20 | 2 |
| 7 | Address2 | Address8 | USPS | FirstClassMail | 5-Feb-20 | 10-Feb-20 | 5 |
| 8 | Address2 | Address9 | USPS | FirstClassMail | 12-Feb-20 | 19-Feb-20 | 7 |
| 9 | Address2 | Address10 | USPS | FirstClassMail | 12-Feb-20 | 15-Feb-20 | 3 |
| 10 | Address2 | Address11 | UPS | Ground | 5-Feb-20 | 12-Feb-20 | 7 |
| 11 | Address2 | Address12 | UPS | Ground | 8-Feb-20 | 13-Feb-20 | 5 |
| 12 | Address2 | Address13 | UPS | Ground | 12-Feb-20 | 14-Feb-20 | 2 |

Historical shipment data record 503

Historical shipment data record 504

FIGURE 5

Collection of Shipping Lane Data Sets 601

| Shipment ID | Origin 3-digit Zip | Destination 5-digit zip | Carrier | Service | Pick-Up-Date | Delivery-Date | Days in Transit | Shipping Lane |
|---|---|---|---|---|---|---|---|---|
| 1 | Zip3_A | Zip5_A | USPS | FirstClassMa | 1-Jan-20 | 3-Jan-20 | 2 | 1 |
| 2 | Zip3_A | Zip5_B | USPS | FirstClassMa | 5-Jan-20 | 10-Jan-20 | 5 | 2 |
| 3 | Zip3_A | Zip5_B | USPS | FirstClassMa | 7-Jan-20 | 11-Jan-20 | 4 | 2 |
| 4 | Zip3_A | Zip5_C | USPS | Priority Mail | 1-Jan-20 | 3-Jan-20 | 2 | 3 |
| 5 | Zip3_A | Zip5_C | USPS | Priority Mail | 5-Jan-20 | 7-Jan-20 | 2 | 3 |
| 6 | Zip3_A | Zip5_D | USPS | Priority Mail | 7-Jan-20 | 9-Jan-20 | 2 | 4 |
| 7 | Zip3_A | Zip5_E | USPS | FirstClassMa | 5-Feb-20 | 10-Feb-20 | 5 | 5 |
| 8 | Zip3_A | Zip5_B | USPS | FirstClassMa | 12-Feb-20 | 19-Feb-20 | 7 | 2 |
| 9 | Zip3_A | Zip5_C | USPS | FirstClassMa | 12-Feb-20 | 15-Feb-20 | 3 | 3 |
| 10 | Zip3_A | Zip5_C | UPS | Ground | 5-Feb-20 | 12-Feb-20 | 7 | 3 |
| 11 | Zip3_A | Zip5_A | UPS | Ground | 8-Feb-20 | 13-Feb-20 | 5 | 1 |
| 12 | Zip3_A | Zip5_A | UPS | Ground | 12-Feb-20 | 14-Feb-20 | 2 | 1 |

Shipping Lane Data Set 602

Shipping Lane Data Set 603

FIGURE 6

Collection of
Shipping Lane
Data Sets
700

Time in Transit Data 701

| Shipping Lane (Zip3->Zip5) | Carrier | Service | Days in Transit | Days in Transit Percentile | Num. Historical Shipments |
|---|---|---|---|---|---|
| 941** > 07081 | USPS | FirstClassMail | 2 | 0.05 | 740 |
| 941** > 07081 | USPS | FirstClassMail | 3 | 0.87 | 740 |
| 941** > 07081 | USPS | FirstClassMail | 4 | 0.08 | 740 |
| 941** > 07081 | USPS | PriorityMail | 0 | 0.07 | 390 |
| 941** > 07081 | USPS | PriorityMail | 1 | 0.13 | 390 |
| 941** > 07081 | USPS | PriorityMail | 2 | 0.8 | 390 |
| 941** > 90401 | USPS | FirstClassMail | 3 | 0.03 | 1276 |
| 941** > 90401 | USPS | FirstClassMail | 4 | 0.07 | 1276 |
| 941** > 90401 | USPS | FirstClassMail | 5 | 0.9 | 1276 |
| 941** > 90401 | UPS | Ground | 3 | 0.02 | 415 |
| 941** > 90401 | UPS | Ground | 4 | 0.03 | 415 |
| 941** > 90401 | UPS | Ground | 5 | 0.95 | 415 |

711 → rows 1-3; 712 → rows 4-6; 713 → rows 7-9; 714 → rows 10-12

FIGURE 7A

Time in Transit Data 702

| Shipping Lane (Zip3->Zone) | Carrier | Service | Days in Transit | Days in Transit Percentile | Num. Historical Shipments |
|---|---|---|---|---|---|
| 941** > Zone 8 | USPS | FirstClassMail | 2 | 0.09 | 1400 |
| 941** > Zone 8 | USPS | FirstClassMail | 3 | 0.9 | 1400 |
| 941** > Zone 8 | USPS | FirstClassMail | 4 | 0.01 | 1400 |
| 941** > Zone 8 | USPS | PriorityMail | 0 | 0.06 | 987 |
| 941** > Zone 8 | USPS | PriorityMail | 1 | 0.06 | 987 |
| 941** > Zone 8 | USPS | PriorityMail | 2 | 0.88 | 987 |
| 941** > Zone 1 | USPS | FirstClassMail | 3 | 0.02 | 2100 |
| 941** > Zone 1 | USPS | FirstClassMail | 4 | 0.08 | 2100 |
| 941** > Zone 1 | USPS | FirstClassMail | 5 | 0.9 | 2100 |
| 941** > Zone 1 | UPS | Ground | 3 | 0.001 | 1002 |
| 941** > Zone 1 | UPS | Ground | 4 | 0.009 | 1002 |
| 941** > Zone 1 | UPS | Ground | 5 | 0.99 | 1002 |

721 → rows 1-3; 722 → rows 4-6; 723 → rows 7-9; 724 → rows 10-12

FIGURE 7B

| Shipping Lane (Zip5->Zip5) "Reflexivity" | Carrier | Service | Days in Transit | Days in Transit Percentile | Num. Historical Shipments |
|---|---|---|---|---|---|
| 94404 > 07081; 07081 > 94404 | USPS | FirstClassMail | 3 | 0.03 | 525 |
| 94404 > 07081; 07081 > 94404 | USPS | FirstClassMail | 4 | 0.04 | 525 |
| 94404 > 07081; 07081 > 94404 | USPS | FirstClassMail | 5 | 0.93 | 525 |
| 94404 > 07081; 07081 > 94404 | USPS | PriorityMail | 1 | 0.02 | 643 |
| 94404 > 07081; 07081 > 94404 | USPS | PriorityMail | 2 | 0.7 | 643 |
| 94404 > 07081; 07081 > 94404 | USPS | PriorityMail | 3 | 0.91 | 643 |

Time in Transit Data 703 (columns: Days in Transit, Days in Transit Percentile, Num. Historical Shipments)

731 groups the first three FirstClassMail rows; 732 groups the three PriorityMail rows.

FIGURE 7C

SYSTEM AND METHOD FOR PROCESSING SHIPMENT REQUESTS USING A MULTI-SERVICE SHIPPING PLATFORM

TECHNICAL FIELD

This invention relates generally to the shipping logistics field, and more specifically to a new and useful system and method for processing shipment requests using a shipping services software platform.

BACKGROUND

In the shipping logistics field, shippers can select one of several carriers to fulfill a shipment request, and each carrier can provide several shipping services for a shipper to select. Some shipping services may have a maximum delivery time guarantee (e.g., two day shipping), whereas other services do not. Cost for services with guaranteed delivery times are typically more expensive than costs for services without delivery time guarantees. However, in some cases, a shipping service without a guaranteed delivery time might be good enough for delivery to at least one destination.

BRIEF DESCRIPTION OF THE FIGURES

FIG. 5 is a representation of exemplary historical shipment data for several delivered shipments, in accordance with variations.

FIG. 6 is a representation of exemplary shipping lane data sets generated from historical shipment data for several delivered shipments, in accordance with variations.

FIG. 7A is a representation of exemplary time in transit data for shipping lane data sets for shipping lanes identified by a 3-digit origin zip code and a 5-digit destination zip code, in accordance with variations.

FIG. 7B is a representation of exemplary time in transit data for shipping lane data sets for shipping lanes identified by a 3-digit origin zip code and a destination shipping zone, in accordance with variations.

FIG. 7C is a representation of exemplary time in transit data for shipping lane data sets for shipping lanes identified by a 5-digit origin zip code and a 5-digit destination zip code, wherein data for shipments in each direction of a shipping lane are aggregated, in accordance with variations.

DESCRIPTION OF THE PREFERRED EMBODIMENTS

Figure 1:
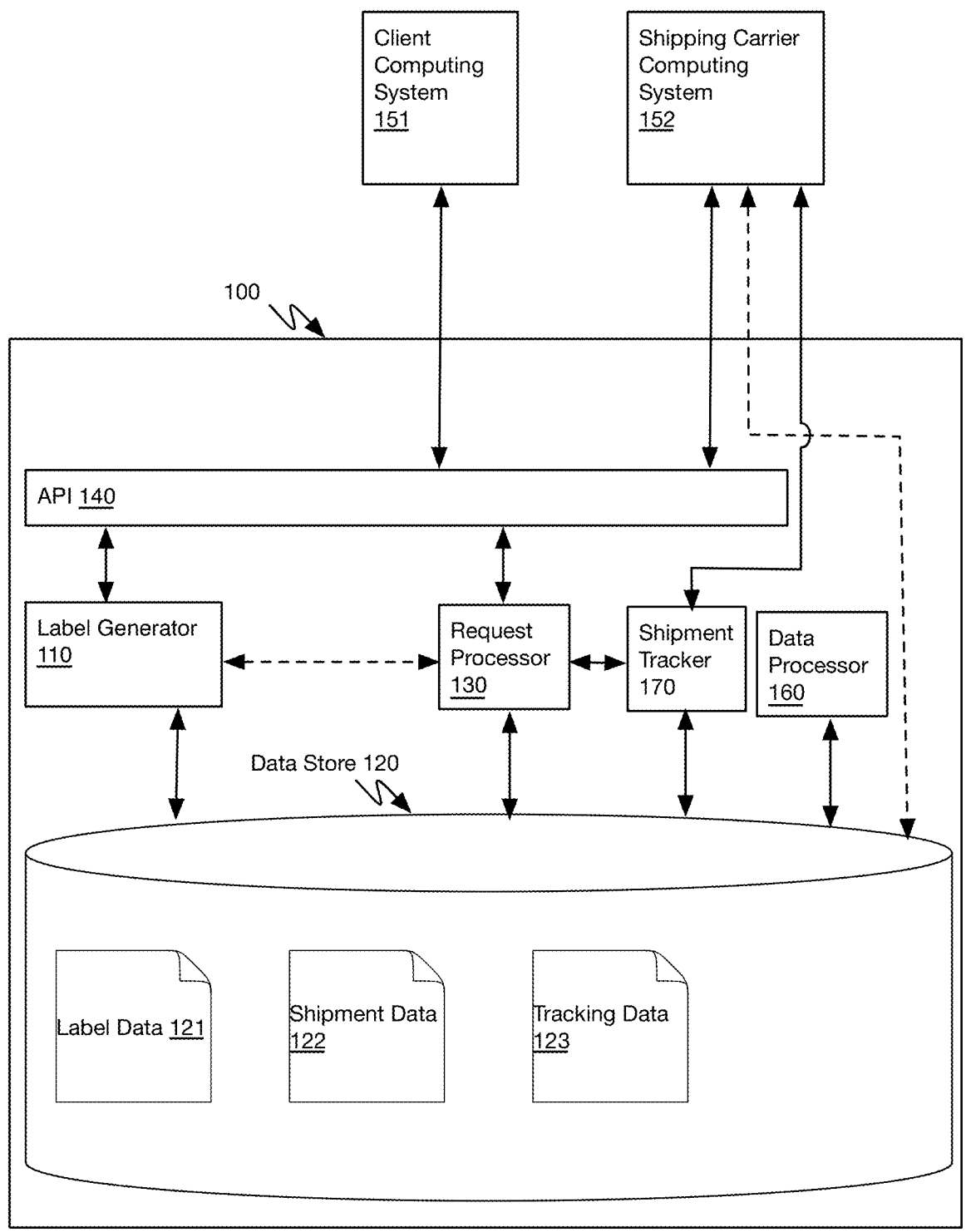
FIG. 1 is a schematic representation of a system, in accordance with variations.

The following description of the preferred embodiments is not intended to limit the disclosure to these preferred embodiments, but rather to enable any person skilled in the art to make and use such embodiments.

1. Overview

The inventors herein have observed that some shipping carrier services are likely to satisfy a shipping customer's time in transit requirements, even though the shipping carrier does not guarantee a time in transit that satisfies the customer's requirements. For example, for some shipping lanes, U.S. Postal Service Ground Shipping typically completes a shipment in two business days, even though time in transit is not guaranteed. By leveraging shipment data for a shipping lane for a shipping carrier service for several shipments (e.g., a statistically significant number of shipments), a time in transit forecast may be obtained for a shipment, even though the shipping carrier does not publish or guarantee a maximum time in transit for the shipping carrier service. Using such forecasts, a lower priced shipping carrier service can be selected for a shipment that is to be delivered within a target amount of days (as compared with a carrier service that guarantees that the package will be delivered within the target amount of days, e.g., 2-day shipping). By using such forecasts to select a suitable carrier service that satisfies a shipping customer's requirements, the shipping customer can realize cost savings on the shipment.

The system and method disclosed herein relate to using shipment data for past shipments to process shipment requests for new shipments. In some variations, the system is a shipping services platform (e.g., 100 shown in FIG. 1A). In variants, the shipping services platform includes an application programming interface (API). The API can be a REST (Representational State Transfer) API (e.g., 140 shown in FIG. 1). In some implementations, the API functions to process API requests for parcel shipping and logistics processing functionality (e.g., shipment requests for selection of a shipping carrier service for a shipment, shipment requests for generation of a shipping label for a shipment, etc.).

At least one component of the system performs at least a portion of the method.

The method 200 can include one or more of: generating multi-service shipment data (e.g., for past shipments), processing a shipment request for a new shipment based on the shipment data, and providing a response to the shipment request. The method can optionally include generating a model by using the shipment data.

In a first variation, tracking data for delivered shipments is accessed, and time-in-transit data is generated by using the accessed tracking data. The time-in-transit data can include time-in-transit data for each of a plurality of shipping lanes, and for each of a plurality of carrier services (for one or more carriers) for a shipping lane. A shipment request is received, and statistically significant time-in-transit data is selected based on the shipment request. Statistically significant time-in-transit data can be selected for a shipping lane of the shipment request (e.g., identified by an origin and a destination identified by the shipment request). A response to the shipment request is generated using the selected significant time-in-transit data.

In second variation, tracking data for delivered shipments is accessed, and training data is generated by using the accessed tracking data. The training data can be augmented using additional data sources (e.g., weather data, traffic data, news headlines, social media data, holiday scheduled, etc.). A model (e.g., a predictive model) is trained by using the training data. The target for the predictive model can be a delivery forecast. Features used by the model to predict the target can include one or more of: origin address (or zip code), destination address (or zip code), parcel weight, parcel dimensions, shipping carrier, shipping carrier service, shipment creation date, weather, etc. A shipment request is received, and a response to the shipment request is generated by using the trained model.

In a first implementation, the generated response to a shipment request includes a delivery forecast (e.g., number of days to deliver the shipment) for at least one shipping carrier service (e.g., a shipping service provided by a shipping carrier, such as United Parcel Service Ground, etc.). In a second implementation, the generated response identifies at least one shipping carrier service that satisfies time-in-transit requirements identified by the shipment request, and that has a shipping rate that is less than (or equal to) a maximum shipping rate. The maximum shipping rate can be a maximum internal shipping rate paid by an entity that manages the shipping services platform, or a maximum external rate paid by a customer of the shipping services platform. In a third implementation, the generated response includes shipping label data for the shipment request. The shipping label data includes data related to a shipping label for at least one shipping carrier service that is selected (e.g., based on the time-in-transit data, based om the trained model, etc.). The shipping label data for a shipping carrier service can include image data for a shipping label, data used to access the shipping label, data used to generate the shipping label, or any other suitable shipping label data.

2. Benefits

Variations of this technology can afford several benefits and/or advantages.

First, carrier services that satisfy time-in-transit criteria can be identified, regardless of guaranteed maximum transit times.

Second, such carrier services can be more accurately identified by generating statistically significant time-in-transit data for various shipping lanes across several shipping carriers.

Third, such carrier services can be more accurately identified by generating statistically significant time-in-transit data for shipping lanes at various levels of granularity.

Fourth, such carrier services can be more accurately identified by generating statistically significant time-in-transit data by aggregating shipment data for shipping lanes regardless of shipment direction along a shipping lane.

Fifth, such carrier services can be more accurately identified by generating statistically significant time-in-transit data by aggregating shipment data for shipments whose shipping lanes overlap with a common shipping lane segment.

Sixth, such carrier services can be more accurately identified by combining historical shipping data with additional data from other data sources.

Further benefits are provided by the system and method disclosed herein.

3. System

The system can be a local (e.g., on-premises) system, a cloud-based system, or any combination of local and cloud-based systems. The system can be a single-tenant system, a multi-tenant system, or a combination of single-tenant and multi-tenant components.

In some variations, the system is a shipping services platform (e.g., 100 shown in FIG. 1). In variants, the shipping services platform includes an application programming interface (API) (e.g., 140 shown in FIG. 1). In some implementations, the API is a REST API. However, the API can be any suitable type of API that functions to receive requests from systems external to the platform 100. In variants, the API is a public API that is accessible by computing systems via a public network (e.g., the Internet). In some implementations, the API functions to process API requests for parcel shipping and logistics processing functionality. In variants, the shipping services platform is a multi-carrier, multi-services shipping platform that functions to process API requests for parcel shipping and logistics processing functionality for several shipping carrier services (e.g., several carrier services provided by one or more shipping carriers). For example, the shipping services platform can generate shipping labels (and optionally tracking information) for any one of a plurality of shipping carriers (e.g., United States Postal Service, Federal Express, United Parcel Service, etc.) supported by the shipping services platform. Additionally (or alternatively), the shipping services platform can generate shipping labels (and optionally tracking information) for any one of a plurality of services (e.g., United States Postal Service First Class, United States Postal Service Priority Mail, etc.) provided by a shipping carrier supported by the shipping services platform.

Applications created by application developers (e.g., running on a client computing system 151, a shipping carrier computing system 152, etc.) can interface with the API (e.g., 140) to perform one or more shipping-related process. Shipping related processes can include one or more of: verifying addresses, purchasing shipping, tracking packages, and insuring shipments. However, any suitable shipping-related process can be performed by using the shipping services platform's API.

In variants, computing systems of shipping carriers (e.g., 152) can integrate with the shipping services platform via the API (e.g., 140). In some implementations, shipping carrier computing systems can access the API to provide one or more of: shipping service information provided by the carrier (e.g., including rates, service levels, etc.), shipping label generation information, tracking information, shipping requirements (including manifest requirements, etc.), or any other suitable carrier-related data.

In variants, access to the API is authenticated by using authentication information that is associated with a platform account (e.g., a parent user account, a child account, etc.). The authentication information can be an API key, or any other suitable type of authentication information. The API can be used to perform configuration for a platform account (e.g., configure a user, configure a shipping carrier account, configure a facility, etc.) or retrieve data stored by the shipping services platform (e.g., information stored for a user, etc.). In variants, authentication information for a platform account can be used to access the API from one or more client devices.

In an example, an online store application (e.g., running on the computing system 151) can process several purchase requests (e.g., thousands a day) by a sending shipment request for each purchased item to a respective shipping facility (e.g., via a facility client device). In some cases, a purchase request includes several items, and the items can be shipped from different shipping facilities. Each facility client can use authentication information for a platform account to send a respective shipment request to the API of the shipping services platform 100.

In variants, functionality provided by the shipping services platform can be accessed via a user interface.

In some variations, the system includes a label generator 110. The label generator functions to generate label data. In some implementations, the label generator generates label data in response to a shipment request received via the API 140. The label generator 110 generates label data for a selected shipping carrier (e.g., identified by the shipment request, identified by configuration, etc.). The label generator can use information stored in a data store (e.g., 120) top generate labels. Such information can include one or more of: shipping facility configuration (e.g., address of shipping facility that sends the shipment), shipping sender configuration, and shipping carrier configuration. However, the label generator no can use any suitable information to generate a shipping label.

In variants, the label generator generates label data 121 for each generated shipping label and stores the label data 121 at the data store 120.

In some variations, the system includes a request processor 130. The request processor functions to process shipment requests. In some implementations, the request processor 130 generates label data in response to a shipment request received via the API 140.

In some variations, the system includes a data processor 160. The data processor 160 functions to generate multi-service shipment data 122 by using data accessed from one or more data sources (e.g., tracking data 123 generated by the shipment tracker 170), and optionally store the shipment data in the data store 120.

In some variations, the system includes a shipment tracker 170 that generates tracking data by using data accessed from one or more data sources (e.g., a shipping carrier computing system 152, etc.), and optionally stores the tracking data in the data store 120.

In some variations, one or more of the components of the system are implemented as a hardware device that includes one or more of a processor (e.g., a CPU (central processing unit), GPU (graphics processing unit), NPU (neural processing unit), etc.), a display device, a memory, a storage device, an audible output device, an input device, an output device, and a communication interface. In some variations, one or more components included in hardware device are communicatively coupled via a bus. In some variations, one or more components included in the hardware system are communicatively coupled to an external system via the communication interface.

The communication interface functions to communicate data between the hardware system and another device via a network (e.g., a private network, a public network, the Internet, and the like).

In some variations, the storage device includes the machine-executable instructions for performing at least a portion of the method 200 described herein.

In some variations, the storage device includes the data included in the data store 120.

The input device functions to receive user input.

In some variations, at least one component of the system performs at least a portion of the method disclosed herein.

4. Method

Figure 2:
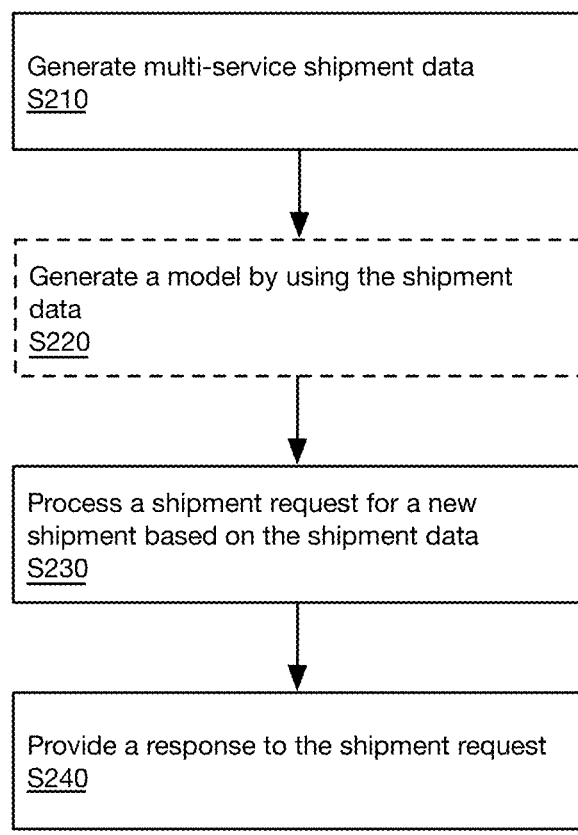
FIG. 2 is a schematic representation of a method, in accordance with variations.

FIG. 2 is a representation of the method 200, according to variations.

The method 200 can include one or of: generating multi-service shipment data (e.g., for past shipments) S210; processing a shipment request for a new shipment based on the shipment data S230; and providing a response to the shipment request S240. The method can optionally include generating a model by using the shipment data S220.

In some variations, at least one component of the system 100 performs at least a portion of the method 200.

In variants, the data processor 160 generates the multi-service shipment data 122. However, any suitable component of the system can generate the shipment data 122.

Generating multi-service shipment data S210 can include generating data (e.g., 122 shown in FIG. 1) for several shipping services. The generated shipment data includes data for at least one shipping service of at least one shipping carrier. The generated shipment data can include data for several shipping services provided by a single shipping carrier. Alternatively, the generated shipment data can include data for services provided by multiple shipping carriers.

In variants, the multi-service shipment data is generated by using tracking data (e.g., 123).

Figure 3:
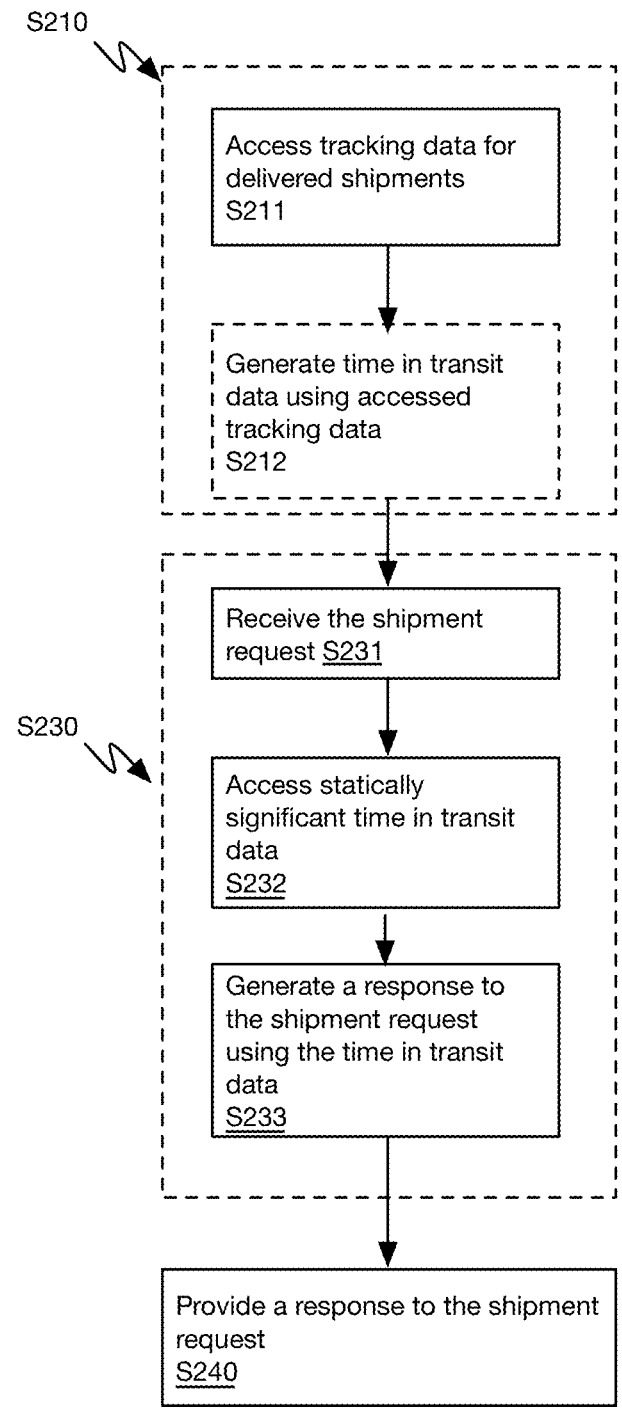
FIG. 3 is a schematic representation of a method that includes generating a response to a shipment request using accessed time-in-transit data, in accordance with variations.
Figure 4:
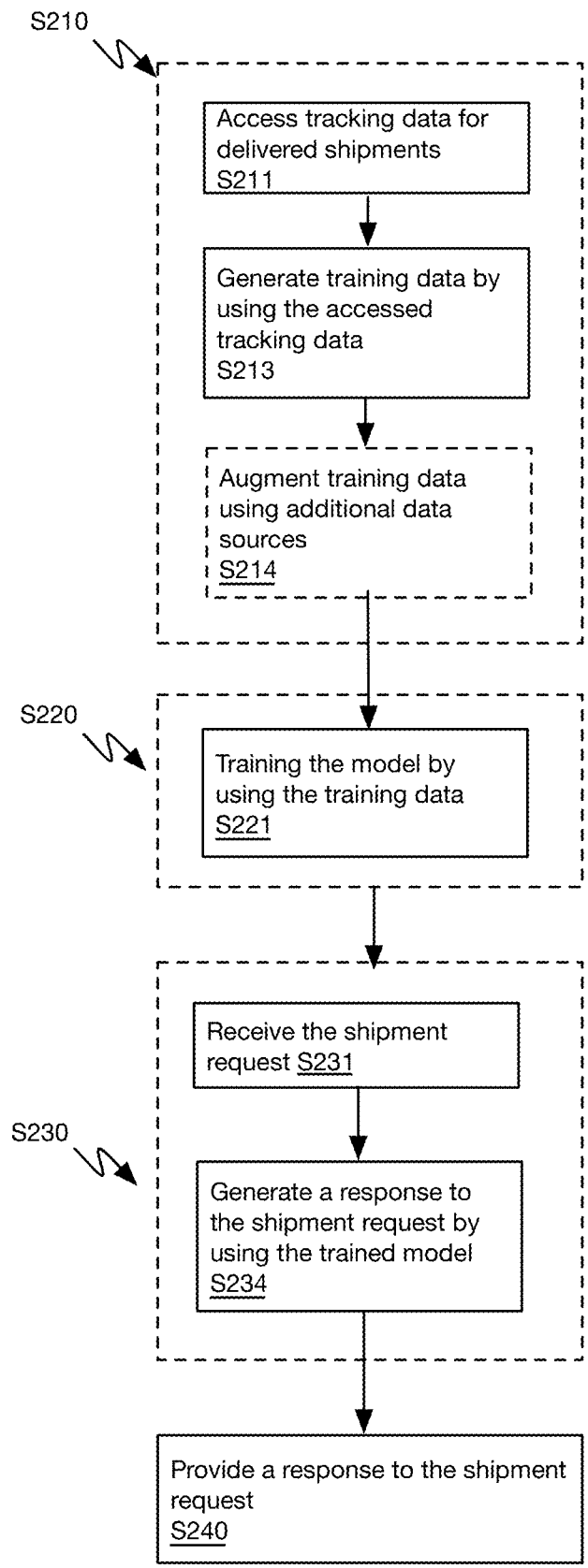
FIG. 4 is a schematic representation of a method that includes generating a response to a shipment request by using a model that is trained by using training data that is generated by using tracking data accessed for delivered shipments, in accordance with variations.

In variants, generating multi-service shipment data S210 includes accessing tracking data for delivered shipments (S211 shown in FIGS. 3 and 4). In variants, the data processor 160 accesses the tracking data (e.g., from the data store 120, from the shipment tracker 170, from a shipment carrier computing system 152, from a publicly available database, from a web site, etc.). However, any suitable component of the system can access the tracking data. The tracking data can include tracking data for shipments initiated by using the platform, and optionally include tracking data for shipments initiated outside of the platform 100.

In some implementations, tracking data is automatically generated when a shipment is initiated by using the platform 100 (e.g., in response to a request received via the API 140 and processed by the request processor 130). Additionally, or alternatively, the platform 100 generates tracking information in response to receiving a tracking code (e.g., generated by shipping carrier system 152). In some variations, the platform 100 also receives information that identifies a shipping carrier associated with the tracking code. Alternatively, the platform 100 can determine the carrier based on the received tracking code.

For example, tracking codes for shipments initiated directly using a shipping carrier computing system 152 (without using the platform 100 to initiate the shipment) can be provided to the platform 100 for use in generating the tracking data. As new shipments are initiated (by using the platform 100, by using a shipping carrier computing system 152, etc.), additional tracking data 123 is generated, which can be used to update the shipment data 122.

Tracking data can be accessed in any suitable manner (e.g., in response to a trigger, upon expiration of a timer, in response to receiving a notification that new tracking data is available, etc.), and shipment data can be updated in any suitable manner (e.g., in response to a trigger, upon expiration of a timer, in response to receiving a notification that new tracking data has been accessed, etc.). In variants, shipment data 122 is updated (e.g., in real-time) as new tracking data 123 is accessed from one or more shipping carrier computing systems.

Tracking data 123 for a shipment can include one or more of: a shipping status (e.g., in transit, delivered, etc.); a message from the carrier; a location (e.g., city, state, country, and zip information about the location); a shipping carrier identifier; a service type; a container type; an estimated delivery date; an estimated delivery time; a date shipment was picked up for delivery; a date shipment was delivered to a final destination; origin address information; destination address information; a shipment identifier; scan event information (e.g., description, location, time, source, etc. of one or more scan events); and a total time in transit. However, the tracking data can include any suitable type of information. In variants, the tracking data for a shipment is updated to include a new location each time a shipping label of the corresponding package is scanned by using a computing device of the shipping carrier In variants, tracking data 123 for a shipment is continually updated in the background as the shipment moves through its life cycle, regardless of whether or not the shipment was initiated through the platform 100. In some implementations, the tracking data for a shipment is updated when the shipping carrier provides the platform 100 with new tracking data. This information can be consumed by using an API, or any other suitable communication or messaging interface. The tracking data for a shipment can include both the current information about the shipment as well as previous updates.

In variants, updated tracking data is provided by a shipping carrier computing system (e.g., 152). In some implementations, a shipping carrier computing system 152 receives tracking updates for shipments from a mobile computing system associated with a shipping carrier driver, pilot or vehicle. In an example, a driver enters tracking updates (e.g., by scanning a barcode or QR code) using a tablet, phone, or other mobile computing device. In another example, an automated delivery vehicle (e.g., drone, autonomous vehicle, etc.) can automatically scan a code (e.g., barcode, QR code, etc.) of a parcel, record a time and location at which the code is scanned, and provide this tracking information to a shipping carrier computing system 152. However, updated tracking data can otherwise be generated.

Accessing tracking data for delivered shipments S211 can include identifying tracking data for delivered shipments (from tracking that also includes data for un-delivered shipments). In variants, tracking data for delivered shipments is identified based on data included in the tracking data. In some implementations, each tracking data record included in the tracking data 123 includes a status field, and the data processor 160 accesses the tracking data records whose status fields indicate that the related shipment has been delivered. In variants, delivery of a shipment can be identified by detecting an actual delivery date recorded in the tracking data. However, tracking data for delivered shipments can be otherwise accessed.

In a first variation, the tracking data is used as the shipment data 122. For example, metadata for a shipment can be computed on-demand by using the tracking data. In a second variation, the shipment data 122 (e.g., 501 shown in FIG. 5) is generated by using the accessed tracking data. For example, metadata for a shipment (e.g., time-in-transit, etc.) can be pre-computed using the tracking data.

In some variations, generating multi-service shipment data (S210) includes generating time-in-transit data using the accessed tracking data (S212 shown in FIG. 3). The generated time-in-transit data can include time-in-transit data for each of a plurality of shipping lanes (e.g., "941>07081" and "941>07081" shown in FIG. 7A). The generated time-in-transit data can include time-in-transit data for each of a plurality of carrier services (e.g., "USPS First Class Mail", "USPS Priority Mail" shown in FIG. 7A) for a shipping lane (e.g., "941>07081" shown in FIG. 7A**).

In some implementations, the data processor 160 accesses the tracking data for the delivered shipments, and for each delivered shipment, computes the total time in transit (e.g., 502 shown in FIG. 5) by comparing the date the shipment's parcel was picked up for delivery (from the origin address of the shipment) with the date the shipment's parcel was delivered to the destination address of the shipment. In variants, the data processor 160 creates a historical shipment data record (e.g., 503, 504) for each delivered shipment, and each historical shipment data record includes at least one of: origin address information (e.g., full address, partial address, zone); destination address information (e.g., full address, partial address, zone); pick-up date; delivery date; time in transit computed for the shipment; carrier used for the shipment; and carrier service used for the shipment. However, historical shipment data records can include any suitable information.

Generating time-in-transit data at S212 can include generating time-in-transit data for shipping lanes at various levels of granularity (e.g., "941>07081" shown in FIG. 7A, "941>Zone 8" shown in FIG. 7B). At a first level of granularity, a shipping lane is defined as a pair of origin and destination zones (e.g., universal zones, carrier-specific zones, etc.). At a second level of granularity, a shipping lane is defined as a pair of an origin partial address (e.g., partial zip code, full zip code, etc.) and a destination zone. At a third level of granularity, a shipping lane is defined as a pair of an origin partial address (e.g., partial zip code, full zip code, etc.) and a destination partial address (e.g., e.g., partial zip code, full zip code, etc.). In some implementations, since shipping lanes defined at a coarser level of granularity encompass several unique addresses, the system is likely to store more data sets for coarsely defined shipping lanes (e.g., shipping lanes in which origin and destination are identified by zones) as compared to more finely defined shipping lanes (e.g., shipping lanes in which origin and destination are identified by full zip codes).

In an example, the data processor 160 uses the historical shipment data sets created for each delivered shipment to generate time in transit data (e.g., 701) that provides days-in-transit percentiles for at least one carrier service for at least one shipping lane.

In variants, generating time-in-transit data for shipping lanes includes generating shipping lane data sets (e.g., 602, 603 shown in FIG. 6, 711-714 shown in FIG. 7A, 721-724 shown in FIG. 7B) for one or more shipping lanes by using the tracking data accessed at S211. Shipping lane data sets can be generated directly from tracking data, or generated from historical shipment data records (e.g., 503, 504) that have been generated from the tracking data. In variants, generating a shipping lane data set includes identifying historical shipment data records (e.g., 503, 504) that match with a same shipping lane.

In variants, each shipping lane is identified by an origin and a destination. In variants, origins and destinations are represented by address information or zone information. Origins and destinations can be represented by full addresses or partial addresses (e.g., zip code only, etc.). In variants, address information used to identify origins and destinations does not include any personally identifiable information (PII). Address information can include zip code information. Zip code information can include a full zip code (e.g., five-digit zip code, a nine-digit zip code, etc.) or a partial zip code (e.g., a three-digit zip code). In variants, zone information identifies a universal zone (e.g., used by several shipping carriers). Additionally, or alternatively, zone information identifies a carrier-specific shipping zone defined by a single shipping carrier (e.g., a United States Postal Service Zone) (which may or may not be used by other shipping carriers).

In a first variation, generating shipping lane data sets includes: labeling historical shipment data records with an identifier for a matching shipping lane such that historical shipment data records matching a same shipping lane can be identified and aggregated at any suitable time.

In a second variation, generating shipping lane data sets includes: aggregating and storing the data for historical shipment data records that match with a same shipping lane. Data for historical shipment data records can be aggregated in any suitable manner.

In variants, a data aggregation rule is defined for one or more levels of granularity, and data for historical shipment data records is aggregated in accordance with each defined aggregation rule.

In a first example of an aggregation rule, data for historical shipment data records having a same origin and destination full address is aggregated.

In a second example of an aggregation rule, data for historical shipment data records having a same origin full address and destination partial address is aggregated.

In a second example of an aggregation rule, data for historical shipment data records having a same origin partial address and destination full address is aggregated.

In a fourth example of an aggregation rule, data for historical shipment data records having a same origin and destination partial address is aggregated.

In a fifth example of an aggregation rule, data for historical shipment data records having a same origin five-digit zip code and destination five-digit zip code is aggregated.

In a sixth example of an aggregation rule, data for historical shipment data records having a same origin five-digit zip code and destination three-digit zip code is aggregated.

In a seventh example of an aggregation rule, data for historical shipment data records having a same origin three-digit zip code and destination five-digit zip code is aggregated.

In a eight example of an aggregation rule, data for historical shipment data records having a same origin three-digit zip code and destination three-digit zip code is aggregated.

In a ninth example of an aggregation rule, data for historical shipment data records having a same origin three-digit zip code and destination zone is aggregated.

In a tenth example of an aggregation rule, data for historical shipment data records having a same origin zone and destination zone is aggregated.

In an eleventh example of an aggregation rule, data for historical shipment data records having a same origin distribution center and destination distribution center is aggregated. In variants, distribution centers are identified by full addresses. Alternatively, distribution centers are defined by partial addresses. An origin distribution center for a shipment is the first intermediate destination for a shipment, and a destination distribution center for a shipment is the last intermediate destination for a shipment before the shipment reaches its final destination. In variants, the origin distribution center for a shipment is identified by scan event information recorded in tracking data for the shipment. Similarly, the destination distribution center for a shipment is identified by scan event information recorded in tracking data for the shipment.

In a twelfth example of an aggregation rule, data for historical shipment data records having overlapping shipping lane segments is aggregated. In variants, a shipping lane segment is defined by a segment origin and a segment destination. In some implementations of the twelfth example of an aggregation rule, data for historical shipment data records whose shipping lanes overlap with a shipping lane segment, whose shipping origin is within a threshold distance from the segment origin, and whose destination is within a threshold distance from the segment destination, is aggregated. For example, if several shipments involve transfer of a parcel from a first distribution center (segment origin) to a second distribution center (segment destination), and the origin for each of the shipments is within a first threshold distance from the first distribution center and the destination for each of the shipments is within a second threshold distance from the second distribution center, then the related data for historical shipment data records is aggregated. In variants, scan event information for tracking data for a historical shipment data record is used to determine whether the shipping lane for the shipment overlaps with a shipping lane segment. In an example, if scan event information for a first scan event (for a shipment) identifies the segment origin (for the shipping lane segment), and scan event information for a subsequent scan event identifies the segment destination, then the shipping lane for the shipment overlaps with the shipping lane. In variants, scan event information for tracking data for a historical shipment data set is used to determine a distance between the shipment's origin and the segment origin, and a distance between the shipment's destination and the segment destination. However, identifying overlapping shipping lanes and determining distances between shipment origin and segment origins (as well as shipment destinations and segment destinations) can be determined in any suitable manner.

In some implementations of the twelfth example of an aggregation rule, data for a historical shipment data record whose shipping lane overlaps with a shipping lane segment is aggregated with other historical shipment data records (whose shipping lanes overlap with the segment) if a distance of the shipping lane segment is greater than a threshold percentage of the total shipping lane distance for the shipping lane of the historical shipment data record. For example, if the shipping lane distance for a historical shipment is 100 miles, the threshold percentage is 90%, and the overlapping shipping lane segment distance is 95 miles, then data for the shipment is aggregated with data for other historical shipments whose shipping lanes overlap with the segment. In variants, the threshold percentage can be selected based on one or more constraints. Such constraints can include at least one of: a minimum shipment threshold requirement amount (which specifies a minimum number of shipments that should be aggregated); and a minimum threshold percentage. In variants, constraints can be adjusted as needed based on the availability of data matching each constraint. In an example, the threshold percentage is 90%, however, any suitable threshold percentage can be selected as the threshold percentage. For example, a lower threshold percentage results in more historical shipment data records being aggregated (thereby resulting in more statistically significant time-in-transit data), but at the cost of the time-in-transit data accurately representing the actual shipping lanes of the historical shipments.

However, data for historical shipment data records can be aggregated in any suitable manner and in accordance with any suitable process or rule.

In a thirteenth example of an aggregation rule, data for historical shipment data records matching either direction of a shipping lane is aggregated. In such an example, a shipping line is defined by a first and second endpoint. Each endpoint can be identified by a full address or a partial address. In such an aggregation rule, data for historical shipment data records having an origin that matches the first endpoint and a destination that matches the second endpoint destination are aggregated, along with data for historical shipment data records having an origin that matches the second endpoint and a destination that matches the first endpoint.

For example, as shown in FIG. 7C, a shipping lane for a first shipping lane data set 731 is identified by two endpoints ("94404" and "07081"). The historical shipment associated with the shipping lane for the data set 731 includes: historical shipments having an origin that matches "94404" and a destination that matches "07081", as well as historical shipments having an origin that matches "07081" and a destination that matches "94404". As shown in FIG. 7C, the data set 731 relates to a first carrier service (USPS First Class Mail), and the data set 732 relates to a second carrier service (USPS Priority Mail). As shown in FIG. 7C, time-in-transit data 703 is stored for each of the shipping lane data sets 731 and 732.

By aggregating data for historical shipment data records matching either direction of a shipping lane, statistically significant time-in-transit data can be generated for a shipping lane that would not otherwise have statistically significant data if shipments in only one direction were aggregated. This technique of aggregating shipment data for a shipping lane regardless of direction can be used to generate statistically significant time-in-transit data for shipping lanes defined at a finer level of granularity than would be possible if shipments in only one direction were aggregated. For example, if there are only 400 shipments from 94404 to 07081 for USPS First Class Mail, and the shipment threshold requirement amount is 500 shipments, then time-in-transit data generated from those 400 shipments is not likely to be statistically significant. However, if there are 125 shipments from 07081 to 94404 for USPS First Class Mail, then the total number of shipments for the two-way pair is 525, which is greater than the shipment threshold requirement amount. Thus, time-in-transit data generated from those 525 shipments is likely to be statistically significant. In this manner, statistically significant time-in-transit data can be generated for shipping lanes identified zips-zips pairs.

In an example, at a first level of granularity, data for historical shipment data records whose 3-digit origin zip code and 5-digit destination zip code match (e.g., as shown in FIG. 7A) are aggregated to generate a shipping lane data set. As shown in FIG. 7A, data for historical shipment data records whose 3-digit origin zip code matches "941" and whose 5-digit destination zip code matches "07081" is aggregated to generate the shipping lane data set 711. In an example, at a second level of granularity, data for historical shipment data records whose 3-digit origin zip code and destination Zone match (e.g., as shown in FIG. 7B) are aggregated to generate a shipping lane data set. As shown in FIG. 7B, data for historical shipment data records whose 3-digit origin zip code matches "941" and whose destination Zone matches "Zone 8" are aggregated to generate the shipping lane data set 721.

In variants, the data processor 160 can generate metadata for a shipping lane at each level of granularity by using the associated aggregated data for historical shipment data records. For example, the data processor 160 can generate a first set of metadata for a first shipping lane using data aggregated for the shipping lane at a first level of granularity, and at least a second set of metadata for the first shipping lane using data aggregated for the shipping lane at a second level of granularity.

FIG. 6 shows an exemplary collection 601 of shipping lane data sets (e.g., 602, 603) that correspond to historical shipment data records (e.g., 503 and 504), respectively, shown in FIG. 5). As shown in FIG. 6, each shipping lane data set identifies a shipment ID, an origin 3-digit zip code, a destination 5-digit zip code, a carrier identifier, a service identifier, a pick-up date, a delivery date, days in transit, and a shipping lane ID. However, shipping lane data sets can include any suitable information. As shown in FIG. 6, the data stored for shipping lane 2 matches shipments having an origin 3-digit zip code "Zip3_A", and a destination 5-digit zip code "Zip5_B".

FIG. 7A shows an exemplary collection of shipping lane data sets 700 that correspond to historical shipment data records. As shown in FIG. 7A, each shipping lane data set identifies at least: a shipping lane; a carrier; a carrier service; time in transit data 701; and a number of historical shipments. As shown in FIG. 7A, each shipping lane is identified by a pair that includes a 3-digit origin zip code and a 5-digit destination zip code (e.g., "941>07081"). The collection of shipping lane data sets 701 can include a different shipping lane data set for each of a plurality of carrier services for a shipping lane. As shown in FIG. 7A, the collection of shipping lane data sets 701 includes two shipping lane data sets for shipping lane "941>07081": a first shipping lane data set 711 for "USPS First Class Mail", and a second shipping lane data set 712 for "USPS Priority Mail". Similarly, the collection of shipping lane data sets 701 includes two shipping lane data sets for shipping lane "941>90401": a first shipping lane data set 713 for "USPS First Class Mail", and a second shipping lane data set 714** for "UPS Ground".

As shown in FIG. 7A, each shipping lane data set (e.g., 711) includes data aggregated from a plurality of historical shipment data records. For example, the shipping lane data set 711 includes data aggregated from 740 historical shipment data records (as shown in the "Num. Historical Shipments" column).

In variants, time-in-transit data for a shipping lane includes time in transit data for a particular shipping lane, carrier, and carrier service. In variants, time in transit data for a shipping lane using a specified carrier and carrier service includes time-in-transit percentile information. For a particular shipping lane, carrier, carrier service, and a selected time-in-transit, the percentile information identifies the likelihood that a shipment using the shipping lane, carrier, and carrier service will be delivered within the selected time-in-transit.

In a first implementation, time-in-transit data (e.g., 701) for a shipping lane data set (e.g., 711) that represents a plurality of historical shipment data records is computed by: identifying each unique days-in-transit value among the shipment data records for the shipping lane data set, and computing a days-in-transit percentile value for each unique days-in-transit value. Each days-in-transit percentile value represents the percentage of shipment data records (represented by the shipping lane data set) that record a days-in-transit value that is equal to (or less than) the unique days-in-transit value associated with the days-in-transit percentile value. For example, as shown in FIG. 7, for the shipping lane data set 712, the unique days-in-transit values included in the shipment data records for the shipping lane data set are 0 (representing same day delivery), 1 and 2, and a days-in-transit percentile value is recorded for each of these unique values. The time in transit data computed for shipping lane data set 712 is generated from 390 historical shipments.

In a second implementation, time-in-transit data for a plurality of historical shipment records is represented as a mean number of days in transit and a corresponding standard deviation value that is computed from the days in transit data identified by each historical shipment record.

In some variations, generating multi-service shipment data (S210) includes generating training data by using the accessed tracking data (S213 shown in FIG. 4). In variants, the training data generated at S213 is augmented (e.g., by the data processor 160) by using additional data from additional data sources (S214 shown in FIG. 4). Additional data can include one or more of: weather data, traffic data, news headlines, social media data, holiday scheduled, and the like. However, the training data can be augmented by using any suitable type of data.

In variants, the training data generated at S213 (and optionally augmented at S214) is used to train a model (e.g., at S221 shown in FIG. 4). In variants, the platform 100 uses a model development system to train the model. The model development system can include a programming environment and tools such as R or python, as well as libraries and tools which allow an operator to prepare, build, train, verify, and publish machine learning models. However, the model can be trained in any suitable manner using the training data generated at S213.

Shipment requests can be processed in any suitable manner.

In variants, the platform 100 receives the shipment request at S231 via the API 140, and the request processor 130 processes the shipment request. The shipment request can be provided by a client computing system 151 (e.g., running a shopping cart application, etc.). In some implementations, the shipment request includes at least one of: an origin address; a destination address; parcel information; customs information; a return address; carrier account information; a set of one or more carrier services. In some implementations, carrier account information includes information for shipping carriers that are configured for the shipper issuing the shipment request. In some implementations, carrier account information for a shipping carrier includes login credentials for accessing a shipping carrier computing system 152 on behalf of the entity that provided the shipment request. In some implementations, carrier account information for a shipping carrier includes payment information used to pay for shipping labels for the associated shipping carrier. In some implementations, parcel information includes dimensions and weight for a parcel associated with the shipment being requested. Parcel information can include a description, or any other suitable information related to the parcel being shipped. In some implementations, customs information includes information used to generate customs forms for international shipping. In variants, the shipment request received at S231 identifies time-in-transit requirements. In some implementation, time-in-transit requirements are represented as a target number of delivery days and a percentile that identifies likelihood of the shipment being delivered within the target number of delivery days.

In some implementations, the request processor 130 uses information included in the shipment request (received at S231) to select one or more shipping carrier services that satisfies the shipment request. In some implementations, the request processor 130 generates a response to the shipment request that identifies each selected shipping carrier service, and a respective shipping rate.

In some variants, selecting shipping carrier services that satisfies the shipment request includes selecting a carrier service that satisfies time-in-transit requirements of the shipment request. In some implementations, a carrier service that satisfies the time-in-transit is a carrier service that has a likelihood of delivering the shipment within the target number of delivery days (identified by the shipment request) that satisfies the delivery days percentile identified by the shipment request.

In a first variation of selecting shipping carrier services that satisfies time-in-transit requirements identified by the shipment request, processing a shipment request S230 includes accessing statistically significant time-in-transit data based on the shipment request S232.

In variants, accessing statistically significant time-in-transit data based on the shipment request S232 includes accessing statistically significant time-in-transit data for each carrier service that matches the shipment request. Carrier services matching the shipment request can be identified based on at least one of: carrier account information identified in the shipment request, a set of one or more carrier services identified in the shipment request, an origin identified by the shipment request, and a destination identified by the shipment request. As an example, a shipment request can specify a set of carrier services that can be used for the shipment. As another example, a carrier service that does not support an origin or destination of the shipment request would not be a matching carrier service.

Matching carrier services can include services of carriers configured for the entity providing the shipping request. For example, a shipper may have pick up locations (and corresponding carrier accounts) configured for only one or two carriers, and thus only services provided by these carriers would match a shipping request for this shipper. Alternatively, matching carrier services can include any carrier service supported by the platform 100 that satisfies constraints of the shipment request.

In some variants, at S232 the request processor 130 computes time-in-transit data (e.g., 701 shown in FIG. 7A) for a carrier service by using the generated shipment data (e.g., 501 shown in FIG. 5) while processing the request. Alternatively, at S232 the request processor 130 accesses pre-computed time-in-transit data (e.g., 701 shown in FIG. 7A) that has been computed in advance (e.g., by using the data processor 160).

In a first variation, pre-computed time-in-transit data is recorded for a particular origin and destination address pair. In a second variation, pre-computed time-in-transit data is recorded for one or more shipping lanes defined at a different level of granularity, and shipment request can match one or more shipping lanes.

Figure 8A:
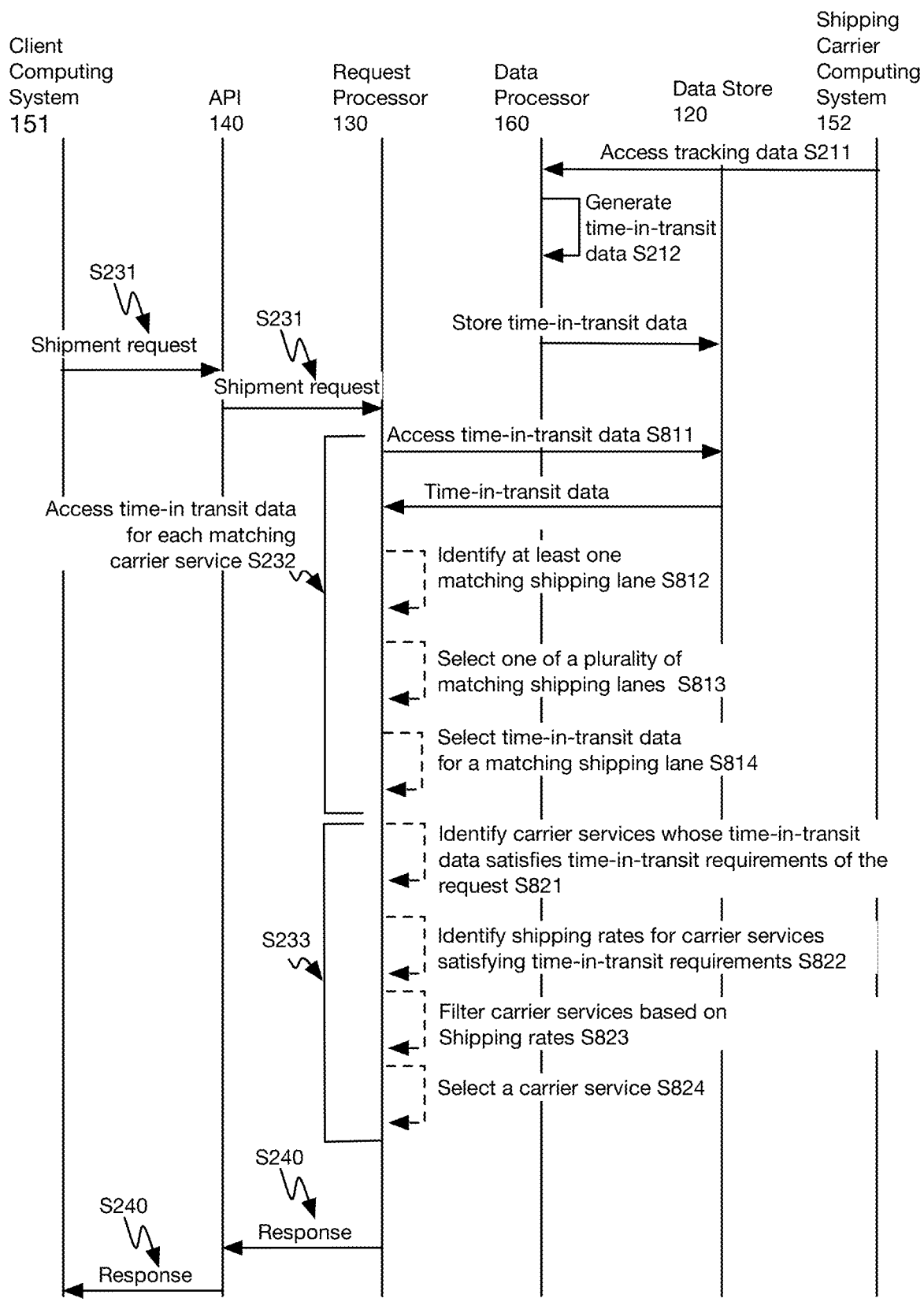
FIG. 8A is a schematic representation of a method that includes generating a response to a shipment request using accessed time-in-transit data, in accordance with variations.

In some implementations, accessing statistically significant time-in-transit data for a carrier service that matches the shipment request (S232) includes: accessing time-in-transit data for at least one shipping lane for the carrier service (S811 shown in FIG. 8A); for the carrier service, identifying at least one shipping lane associated with the accessed time-in-transit data that matches the shipment request (S812); optionally selecting a matching shipping lane for the carrier service based on a selection rule (S813), and optionally selecting the accessed time-in-transit data that corresponds to the selected matching shipping lane for the carrier service (S814), as shown in FIG. 8A. In variants, the selection rule can include constraints related to one or more of: a minimum granularity of the shipping lane definition (e.g., zip3-zone, zone to zone, etc.); a minimum number of historical shipments used to generate the time-in-transit data, or any other suitable constraint.

In variants, if only one shipping lane is identified for a carrier service, then at S812, time-in-transit data for the carrier service for that shipping lane is accessed at S812.

In some variations, identifying each shipping lane that matches the shipment request (S812) includes: comparing the origination address and destination address identified by the shipment request with origin information and destination information for each shipping lane associated with the accessed time-in-transit data. Shipping lane origination information can include one or more of: a full address, a partial address, and a zone. Similarly, shipping lane destination information can include one or more of: a full address, a partial address, and a zone.

Shipping requests can match full shipping lanes. Additionally, or alternatively, shipping requests can match shipping lane segments. In some variations, identifying each shipping lane that matches the shipment request (S812) includes: identifying each shipping lane segment that matches the shipment request. In variants, identifying each shipping lane segment that matches the shipment request includes: identifying at least a first distribution center and a final distribution center for the shipment request, and matching the first distribution center and the final distribution center with endpoints of one or more shipping lane segments. In some implementations, the first and final distribution centers are identified by based on at least a portion of the address for the origin of the shipment request and the destination of the shipment request, respectively. In an example, at least one carrier service (e.g., USPS Priority Mail) is identified for the shipment request (e.g., based on information provided in the shipment request), and for each carrier service, a distribution center of the carrier service that matches the origin address is selected. A distribution center of the carrier service that matches the origin address can be identified based on information published by the carrier providing the service, based on information accessed from a shipping carrier computing system 152, based on a statistical probability generated from historical shipping data, based on a prediction generated from a trained model (trained to predict a first distribution center for a shipment request for a carrier service), or otherwise identified. In an example, the platform can provide an origin address to a shipping carrier computing system 152 (e.g., via a request in accordance with an API of the shipping carrier system), and receive an identifier (e.g., an address) for the first distribution center that is to be used for the origin address. A final distribution center of the carrier service that matches the destination address can be selected in a similar manner.

In variants, in addition to identifying a first distribution center and a final distribution center for the shipment request, intermediate distribution centers are also identified, and used to match with a shipping lane segment for which time-in-transit data is stored by the platform 100. Intermediate distribution centers for a carrier service that are likely to be used for the shipment request can be identified based on information published by the carrier providing the service, based on information accessed from a shipping carrier computing system 152, based on a statistical probability generated from historical shipping data, based on a prediction generated from a trained model, or otherwise identified. In an example, the platform can provide an origin address and a destination address to a shipping carrier computing system 152 (e.g., via a request in accordance with an API of the shipping carrier system), and receive an identifier (e.g., an address) for one or more distribution centers that are to be used for shipment from the origin to the destination. However, distribution centers can be otherwise identified.

In variants, identifying each shipping lane segment that matches the shipment request includes: identifying at least a first intermediate distribution center and a second distribution center for the shipment request, and matching the first intermediate distribution center and the second distribution center with endpoints of one or more shipping lane segments.

In some implementations, the number of historical shipments used to generate time-in-transit data for a shipping lane defined at a finer level of granularity (e.g., zips to zips) is less than the number of historical shipments used to generate time-in-transit data for a shipping lane defined at a coarser level of granularity (e.g., zip3 to zone). In some implementations, the shipping lane selection rule includes a shipment threshold requirement that specifies a minimum number of historical shipments (shipment threshold requirement amount) for a shipping lane. In some implementations, selecting a matching shipping lane based on a selection rule (S813) includes: identifying each matching shipping lane associated with a number of historical shipments greater than the minimum number of historical shipments specified by the threshold requirement, and selecting the identified shipping lane (that satisfies the threshold requirement) that is defined at the finest level of granularity. In some implementations, a shipping lane that is defined at the finest level of granularity is the shipping lane that is the closest match to the origin and destination of the shipment request.

In variants, statistically significant time-in-transit data is data that is computed from more than a threshold amount of historical shipments. In variants, the minimum number of historical shipments (shipment threshold requirement amount) can be predetermined, dynamically determined during processing of a shipment request, or otherwise identified.

In an example, a shipment request can match a first shipping lane whose destination is identified by a three-digit zip code, and a second shipping lane whose destination is identified by a zone. Although the first shipping lane matching with the three-digit zip code is a more accurate match with the destination of the shipment request, the time in transit data associated with the second shipping lane matching with the zone might be more accurate. A shipping lane data set for the first shipping lane might have less historical shipment data records (e.g., "Num. Historical Shipments, shown in FIG. 7A), as compared with a shipping lane data set for the second shipping lane. For example, if few shipments have been sent to the three-digit zip code matching the destination specified in the shipment request, but several shipments have been sent to the zone matching the destination, then the shipping lane data set for the second shipping lane might be a more reliable data set. For example, a shipment request for sending a parcel from an origin having zip code 94104 to a destination having a zip code 07081 using USPS Priority Mail matches both the shipping lane data set 712 shown in FIG. 7A the shipping lane data set 722 shown in FIG. 7B. Although the shipping lane data set 712 is a more accurate match than the shipping lane data set 722 (since the destination in data set 712 is matched using a 5-digit zip code instead of a zone, as with data set 722), the shipping lane data set 722 is generated from more historical shipments. Therefore, the time-in-transit data 702 computed for the shipping lane data set 722 might be more accurate than the time-in-transit data 701 computed for the shipping lane data set 712 (which is generated from only 390 historical shipments).

As more shipments are processed by the request processor 130, additional shipment data is recorded for each shipping lane. Therefore, as more shipments are processed, the platform 100 may be able to select a shipping lane data set with a finer level of granularity for a particular shipment request.

The time-in-transit data (accessed at S232) is used at S233 to generate a response to the shipment request (e.g., received at S231).

Generating a response using time-in-transit data (S233) can include identifying carrier services whose time-in-transit data satisfies time-in-transit requirements identified by the shipment request (S821). In variants, carrier services that can provide service between the origin and destination identified by the shipment request, and whose time-in-transit data satisfies the time-in-transit requirements of the shipment request are identified. In a first implementation, only carrier services identified by the shipment request are identified. In this manner, a shipper can limit identification to carrier services for which the shipper has a configured carrier account and an established parcel pick-up location (thereby preventing the platform 100 from recommending carrier services that are not already configured for the shipper). Alternatively, any carrier service that can provide service between the origin and destination is selected. In this manner, the platform 100 can suggest that the shipper configure an additional carrier service.

In variants, determining whether a carrier service's time-in-transit data satisfies time-in-transit requirements identified by the shipment request includes: identifying a target number of days and a minimum days-in-transit percentile specified by the shipment request. A comparison is made to determine whether the carrier service's time-in transit data includes a days-in-transit percentile that: exceeds the minimum days-in-transit percentile; and that is associated with a number of days in transit that is equal to (or less than) the target number of days. If the carrier service's time-in transit data includes a days-in-transit percentile that exceeds the minimum days-in-transit percentile and that is associated with a number of days in transit that is equal to (or less than) the target number of days, then the carrier service's time-in-transit data satisfies time-in-transit requirements identified by the shipment request.

For example, as shown in FIG. 7B, the carrier service "United States Postal Service (USPS)" "Priority Mail" matches a shipment request that identifies carrier account information for USPS, an origin having a "941" 3-digit zip code, a destination having a Zone 8 USPS shipping zone, "2" as a target number of delivery days, and "80th percentile" as a minimum days-in-transit percentile. Since the target number of delivery days is "2", and the minimum percentile is "80th percentile", the time in transit data for USPS "Priority Mail" (2 days, 88th percentile, shown in FIG. 7B) satisfies the time-in-transit requirements (2 days, Both percentile) of the shipment request. Since the days-in-transit percentile for the carrier service "USPS" "First Class Mail" for an origin having a "941" 3-digit zip code and a destination having a Zone 8 USPS shipping zone is "0.09th percentile" for 2 days in transit, the "USPS" "First Class Mail" carrier service does not satisfy the time-in-transit requirements (2 days, Both percentile) of the shipment request.

Generating a response using time-in-transit data (S233) can include identifying shipping rates for carrier services whose time-in-transit data satisfies time-in-transit requirements identified by the shipment request (S822).

Generating a response using time-in-transit data (S233) can include filtering carrier services (whose time-in-transit data satisfies time-in-transit requirements identified by the shipment request) based on the identified shipping rates. (S823). Filtering carrier services based on shipping rates can include selecting carrier services whose shipping rates are below a threshold rate amount.

Generating a response using time-in-transit data (S233) can include selecting a carrier service based on time-in-transit data and rate (S824). In variants, selection is based on a carrier service selection rule. In variants, a carrier service selection rule specifies at least: time-in-transit constraints and rate constraints. In a first example, a carrier service that satisfies time-in-transit requirements and has the cheapest rate is selected. In a second example, a carrier service that is likely to deliver the parcel most quickly (as identified by the time-in-transit data), and whose rate satisfies a maximum rate constraint, is selected. In a third example, the fastest carrier service that satisfies time-in-transit requirements is selected.

In variants, the response generated at S233 includes a delivery forecast for at least one carrier service whose time-in-transit data satisfies the requirements of the shipping request. In some implementations, the delivery forecast for a carrier service is (or is computed using) the days in transit data for the highest days-in-transit percentile in the time-in-transit data for the carrier service.

In variants, the response generated at S233 includes a shipping rate for at least one carrier service whose time-in-transit data satisfies the requirements of the shipping request.

In variants, the response generated at S233 includes an external shipping rate for at least one carrier service whose time-in-transit data satisfies the requirements of the shipping request, and whose internal shipping rate is below a threshold rate amount. In some implementations, the platform 100 pays the internal shipping rate to the carrier, and the shipper (who provides the shipping request) pays the platform the external shipping rate. The difference between the internal shipping rate and the external shipping rate is a profit (or loss) to the platform. By filtering carrier services based on the internal shipping rate, the platform can provide shippers with available carrier services that can be purchased at a published fixed rate. For example, the platform can provide shipping to anywhere for under $10, and filter available carrier services to services that can satisfy the shipment request and also cost the platform at most $10.

In variants, the response generated at S233 identifies a single carrier service.

In variants, the response generated at S233 includes shipping label data for at least one carrier service. In an example, the response identifies a single carrier service that has been selected and provides shipping label data for the selected carrier service. In another example, the response identifies a plurality of carrier services and provides shipping label data for each identified carrier service. The shipping label data for a shipping carrier service can include image data for a shipping label, data used to access the shipping label, data used to generate the shipping label, or any other suitable shipping label data.

Figure 8B:
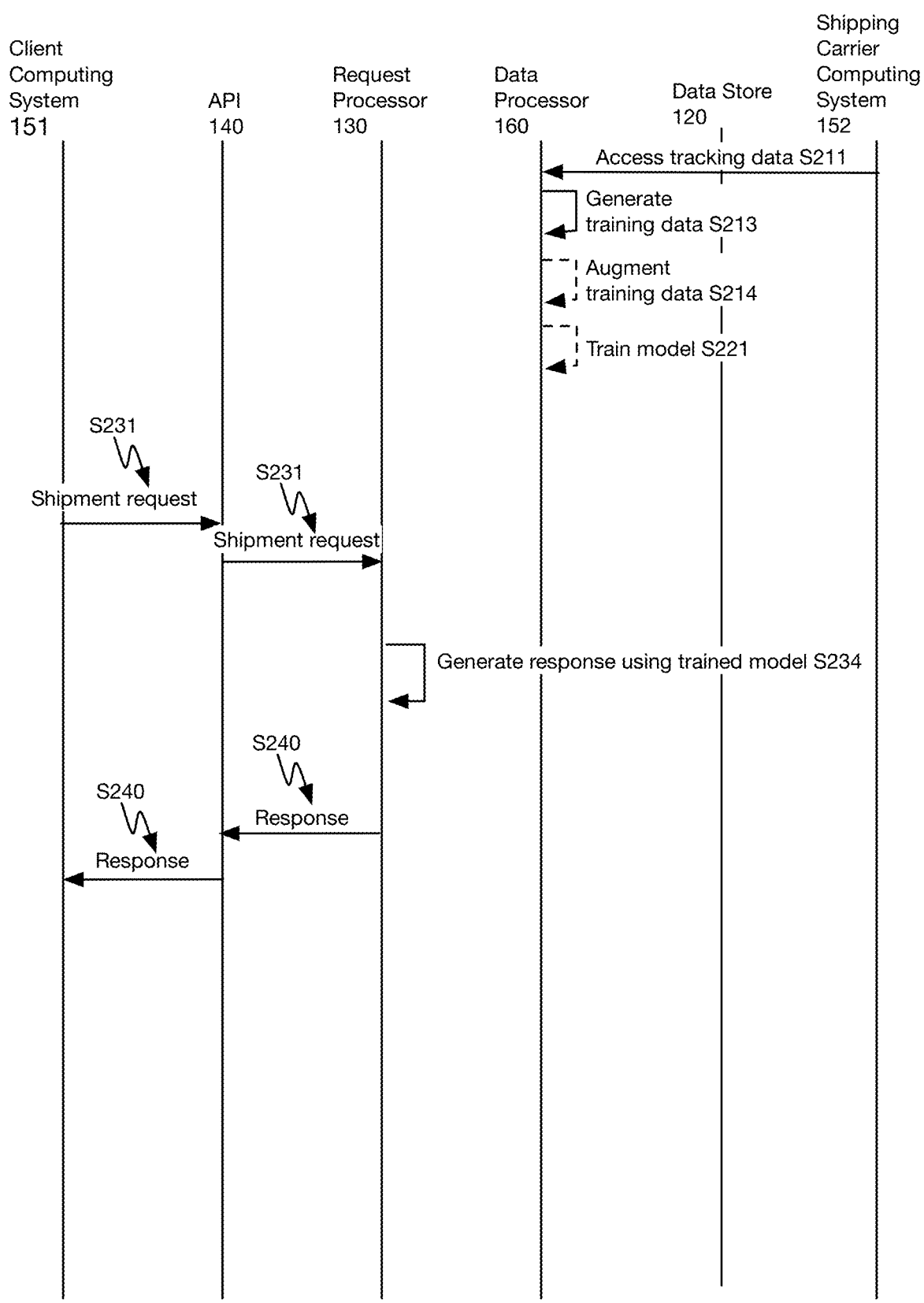
FIG. 8B is a schematic representation of a method that includes generating a response to a shipment request using a trained model, in accordance with variations.

In variants, a response to the shipment request can be generated by using a trained model (S234 shown in FIG. 4). FIG. 8B is a schematic representation of generating a response to a shipment request using the trained model. In variants, data included in the shipment request (received at S231) is provide to the model as input. In some implementations, additional data (e.g., weather data associated with the shipment request, traffic data associated with the shipment request, etc.) is accessed and provided as additional input to the trained model. In variants, the trained model outputs shipping carrier services that satisfy time-in-transit requirements of the shipment request.

In variants, the response generated at S234 identifies each shipping carrier service identified by the trained model. In variants, the response generated at S234 includes a delivery forecast generated by the trained model for at least one shipping carrier service that satisfies the time-in-transit requirements. In variants, the response generated at S234 identifies a shipping rate for at least one carrier service identified by the response. In variants, the shipping rates included in the response are external rates, and the carrier services identified in the response are filtered by a maximum internal shipping rate that is a cost to the platform 100. In variants, the response generated at S234 includes shipping label data for at least one carrier service identified by the response. In variants, the response generated at S234 identifies a single carrier service.

However, the trained model can be used to generate any suitable response at S234.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the disclosed embodiments without departing from the scope of this disclosure defined in the following claims.

We claim:

1. A method comprising: with a multi-tenant, multi-carrier shipping services platform:
    accessing multi-service tracking data for delivered shipments from shipping carrier computing systems of a plurality of shipping carriers, wherein the multi-service tracking data includes tracking data for a plurality of shipping carrier services for the plurality of shipping carriers;
    training a predictive machine learning model, based on the multi-service tracking data, to predict a time-in-transit for each of a set of package percentiles;
    receiving, from a client computing system, a shipment request for a new shipment via a public REST (Representational State Transfer) Application Programming Interface (API) of the shipping services platform, wherein the shipment request comprises a set of time-in-transit requirements, comprising a target time-in-transit for a target package percentile;
    generating a response to the shipment request using the set of time-in-transit requirements and the trained predictive machine learning model, wherein the response identifies at least one shipping carrier service that can be used for delivering a parcel within the target time-in-transit for at least the percentile of packages; and
    providing the response to the client computing system.

2. The method of claim 1:
    further comprising: with the shipping services platform:
        generating time-in-transit data by using the accessed multi-service tracking data,
        for at least one carrier service related to the shipment request, accessing statistically significant time-in-transit data from the generated time-in-transit data,
    wherein the response is generated based on statistically significant time-in-transit data for at least one carrier service related to the shipment request.

3. The method of claim 2,
    wherein generating time-in-transit data by using the accessed multi-service tracking data comprises: generating time-in-transit data for shipping lanes at different levels of granularity,
    wherein each shipping lane is identified by an origin and a destination, and
    wherein for each shipping lane, the origin and destination are identified by partial addresses at respective levels of granularity.

4. The method of claim 3, wherein generating time-in-transit data for a shipping lane comprises: aggregating data for historical shipment data records, for delivered shipments, in accordance with at least one aggregation rule.

5. The method of claim 4, wherein generating time-in-transit data for a shipping lane comprises: aggregating data for historical shipment data records having a same origin and destination partial address.

6. The method of claim 4, wherein generating time-in-transit data for a shipping lane comprises: aggregating data for historical shipment data records having a same origin distribution center and destination distribution center.

7. The method of claim 4, wherein generating time-in-transit data for a shipping lane comprises: aggregating data for historical shipment data records matching either direction of the shipping lane.

8. The method of claim 3,
    wherein, accessing statistically significant time-in-transit data for a carrier service related to the shipment request comprises:
        accessing time-in-transit data for at least one shipping lane for the carrier service,
        for the carrier service, identifying a matching shipping lane that is associated with the accessed time-in-transit data for the carrier service and that matches the shipment request, and
        selecting, from the accessed time-in-transit data for the carrier service, time-in-transit data for the identified matching shipping lane.

9. The method of claim 3,
    wherein, accessing statistically significant time-in-transit data for a carrier service related to the shipment request comprises:
        accessing time-in-transit data for at least one shipping lane for the carrier service,
        for the carrier service, identifying a plurality of matching shipping lanes that are associated with the accessed time-in-transit data for the carrier service and that match the shipment request,
        selecting one of the identified plurality of matching shipping lanes that satisfies a selection rule, and
        selecting, from the accessed time-in-transit data for the carrier service, time-in-transit data for the selected matching shipping lane for the carrier service.

10. The method of claim 9, wherein, for a carrier service, selecting one of the identified plurality of matching shipping lanes that satisfies the selection rule comprises:
    selecting a matching shipping lane that is associated with a number of historical shipments that is greater than a shipment threshold requirement amount, and that is the closest match to the origin and destination of the shipment request.

11. The method of claim 10, wherein the response is generated based on statistically significant time-in-transit data for at least one carrier service related to the shipment request by:
    identifying shipping rates for matching carrier services whose time-in-transit data satisfies the set of time-in-transit requirements identified by the shipment request, and
    including information that identifies at least one matching carrier service and a corresponding shipping rate in the response.

12. The method of claim 10, wherein the response is generated based on statistically significant time-in-transit data for at least one carrier service related to the shipment request by:
identifying shipping rates for matching carrier services,
selecting matching carrier services whose time-in-transit data satisfies the set of time-in-transit requirements identified by the shipment request and whose identified shipping rate is below a threshold rate amount, and
including information in the response that identifies at least one selected matching carrier service whose rate is below the threshold rate amount.

13. The method of claim 10, wherein the response is generated based on statistically significant time-in-transit data for at least one carrier service related to the shipment request by:
selecting a fastest matching carrier service whose time-in-transit data satisfies the set of time-in-transit requirements identified by the shipment request, and
including information in the response that identifies fastest matching carrier service.

14. The method of claim 10, wherein the response is generated based on statistically significant time-in-transit data for at least one carrier service related to the shipment request by:
identifying shipping rates for matching carrier services,
selecting a cheapest matching carrier service whose time-in-transit data satisfies the set of time-in-transit requirements identified by the shipment request, and
including information in the response that identifies cheapest matching carrier service.

15. The method of claim 10,
wherein, for a carrier service, identifying a plurality of matching shipping lanes that are associated with the accessed time-in-transit data and that match the shipment request comprises: identifying at least one matching shipping lane segment that is associated with the accessed time-in-transit data and that matches the shipment request,
wherein identifying at least one matching shipping lane segment that is associated with the accessed time-in-transit data and that matches the shipment request comprises:
identifying at least a first distribution center and a second distribution center for the shipment request, and
matching the first distribution center and the second distribution center with endpoints of one or more shipping lane segments.

16. The method of claim 1:
wherein generating the response to the shipment request comprises:
providing data included in the shipment request to the trained predictive machine learning model as model input,
using the trained predictive machine learning model to identify-carrier services that satisfy the set of time-in-transit requirements, and
including in the response:
information that identifies each carrier service identified by the trained predictive machine learning model, and
a shipping rate for each carrier service identified by the trained predictive machine learning model.

17. The method of claim 16,
further comprising augmenting the training data using additional data accessed from additional data sources,
wherein the predictive machine learning model is trained by using the augmented training data.

18. The method of claim 17, wherein generating the response to the shipment request further comprises:
accessing additional data; and
providing the accessed additional data to the trained machine learning model as additional model input.

19. The method of claim 18, wherein the accessed additional data includes at least one of weather data and traffic data.

* * * * *